United States Patent
Simms (10) Patent No.: US 11,051,190 B2
(45) Date of Patent: Jun. 29, 2021

(54) ADAPTIVE TALKGROUP SELECTION AND RESOURCE ASSIGNMENT FOR LISTENING POSTS

(71) Applicant: MOTOROLA SOLUTIONS, INC., Chicago, IL (US)

(72) Inventor: Matthew E. Simms, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 52 days.

(21) Appl. No.: 15/924,875

(22) Filed: Mar. 19, 2018

(65) Prior Publication Data

US 2019/0289479 A1  Sep. 19, 2019

(51) Int. Cl.
*H04W 24/08* (2009.01)
*H04L 12/26* (2006.01)
*H04W 8/18* (2009.01)
*H04W 24/04* (2009.01)

(52) U.S. Cl.
CPC ......... *H04W 24/08* (2013.01); *H04L 43/0823* (2013.01); *H04W 8/186* (2013.01); *H04W 24/04* (2013.01)

(58) Field of Classification Search
CPC ..... H04W 24/08; H04W 24/00; H04W 24/04; H04W 8/186; H04W 8/18; H04W 8/00; H04L 43/0823; H04L 43/08; H04L 43/00
USPC ........................................................ 370/329
See application file for complete search history.

(56) References Cited

U.S. PATENT DOCUMENTS

| | | | |
|---|---|---|---|
| 8,131,281 B1* | 3/2012 | Hildner | H04L 41/0806 455/418 |
| 8,699,360 B2* | 4/2014 | Kuffner | H04W 16/14 370/252 |
| 9,232,376 B2 | 1/2016 | Senese et al. | |
| 9,288,716 B2 | 3/2016 | Austin et al. | |
| 9,569,467 B1* | 2/2017 | Schechter | G06F 16/27 |
| 9,584,987 B1 | 2/2017 | Bar-On et al. | |
| 2005/0148329 A1 | 7/2005 | Brunet et al. | |
| 2006/0007901 A1* | 1/2006 | Roskowski | H04W 24/00 370/338 |
| 2008/0108345 A1* | 5/2008 | Calin | H04W 16/00 455/424 |

(Continued)

*Primary Examiner* — Jeffrey M Rutkowski
*Assistant Examiner* — Luna Weissberger
(74) *Attorney, Agent, or Firm* — Michael Best and Friedrich LLP (57) ABSTRACT

Adaptive talkgroup selection and resource assignment for listening posts. One example system includes a communication interface and an electronic processor. The electronic processor receives, via the communication interface, a plurality of data capture prioritization parameters for the plurality of communication channels. The electronic processor assigns at least one of the plurality of listening posts to listen for data from at least one of the plurality of communication channels based on the plurality of data capture prioritization parameters. The electronic processor determines, for each of the at least one of the plurality of listening posts, at least one post over-the-air data capture parameter based on the plurality of data capture prioritization parameters. The electronic processor transmits, to each of the at least one of the plurality of listening posts, the at least one post over-the-air data capture parameter for the listening post.

18 Claims, 3 Drawing Sheets

(56) References Cited

U.S. PATENT DOCUMENTS

| | | | |
|---|---|---|---|
| 2008/0244095 A1* | 10/2008 | Vos | H04L 12/5692 |
| | | | 709/250 |
| 2012/0122510 A1* | 5/2012 | Mistro | H04W 72/121 |
| | | | 455/519 |
| 2013/0156175 A1* | 6/2013 | Bekiares | H04L 12/1822 |
| | | | 379/202.01 |
| 2014/0280971 A1* | 9/2014 | Wade | H04L 41/0233 |
| | | | 709/226 |
| 2015/0043539 A1* | 2/2015 | Senese | H04M 11/06 |
| | | | 370/335 |
| 2017/0265076 A1* | 9/2017 | Richards | H04W 12/06 |
| 2017/0374528 A1* | 12/2017 | Bolon | H04W 4/021 |
| 2018/0211115 A1* | 7/2018 | Klein | G08B 25/10 |

* cited by examiner

ADAPTIVE TALKGROUP SELECTION AND RESOURCE ASSIGNMENT FOR LISTENING POSTS

BACKGROUND OF THE INVENTION

Wireless communication systems, for example, trunked land mobile radio (LMR) systems, may include hundreds or even thousands of subscriber units operating in multiple talkgroups across large geographic areas. Subscriber units in such systems are capable of encoding telemetry data into their voice transmissions. Encoded telemetry data is collected and analyzed to monitor the performance of the communication system, to direct maintenance operations for the communication system, and to plan for modification or upgrade of the communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, some trunked wireless communication systems include hardware and software for concurrently transmitting voice and data from subscriber units (for example, portable two-way radios). One method uses concurrent voice and data transmission to send telemetry data from subscriber units. Telemetry data includes, for example, information on radio battery usage, received signal strength information, reports of blocked attempts at push-to-talk transmission (for example, due to a lack of system capacity), and the like. To collect this data, electronic listening posts are used. A listening post is a discreet device, which "parks" its receiver on a talkgroup and listens to traffic (for example, receives radiofrequency transmissions) from subscriber units. As the traffic is received, the listening post extracts the telemetry data from the signals and sends the telemetry data to a server or data storage device.

It is desirable to recover as much telemetry data as possible to adequately monitor and maintain communications systems, especially in mission-critical environments. However, a listening post cannot listen to multiple talkgroups simultaneously. As a consequence, while the listening post is listening to one talkgroup, data produced by other talkgroups may be missed. Simply rotating between talkgroups in a round robin fashion may still result in missed data transmissions. One approach to more complete data collection is to deploy a dedicated listening post on each talkgroup. Using this approach may result in eventually collecting all of the available telemetry data. However, it also results in collecting repeated data, may take longer than desired, and may waste radio and listening post resources. For example, some talkgroups are more active than others. Because the subscriber units transmit more frequently, data can be more quickly collected from an active talkgroup, while data from an inactive talkgroup may take longer to collect due to infrequent transmission of the data.

In addition, some data types may be more important to collect than other data types. For example, signal strength data may not be important for a talkgroup where the subscriber units all operate in close proximity to a repeater. However, signal strength data may be more important for a geographically dispersed talkgroup. In another example, push-to-talk blocks (where a push-to-talk request did not open a channel for the requesting subscriber unit) on a public safety network may be important to track. It may not be desirable to use the same listening post to try to collect more important data from one talkgroup and less important data from another talkgroup. In addition, listening posts are a finite resource, and it is desirable to make the most efficient use of the listening posts. Accordingly, systems and methods are provided herein for, among other things, adaptive talkgroup selection and resource assignment for listening posts.

Rather than using dedicated listening posts or uninformed round-robin monitoring, embodiments provided herein adapt the configurations of the listening posts and add or remove listening posts dynamically. Embodiments presented herein use data capture prioritization parameters (for example, user-defined priorities) to adaptively determine how many listening posts to deploy, what talkgroups the listening posts should listen to, what data should be collected, and for how long. Such embodiments also make use of the harvested data to improve the listening post configurations and increase the efficiency of the listening post deployment. For example, when the desired data is collected from a talkgroup, the listening post that collected the data may be dynamically reassigned to capture different data from another talkgroup. Using such embodiments, system operators are able to collect more data for multiple talkgroups and multiple trunked radio systems in less time than with existing methods. Embodiments described herein therefore result in more efficient use of communication system resources, including listening posts, and improved operation of the communication systems for users, such as public safety personnel.

One example embodiment provides a system for collecting over-the-air data from a plurality of communication channels using a plurality of listening posts. The system includes a communication interface and an electronic processor coupled to the communication interface. The electronic processor is configured to receive, via the communication interface, a plurality of data capture prioritization parameters for the plurality of communication channels. The electronic processor is configured to assign at least one of the plurality of listening posts to listen for data from at least one of the plurality of communication channels based on the plurality of data capture prioritization parameters. The electronic processor is configured to determine, for each of the at least one of the plurality of listening posts, at least one post over-the-air data capture parameter based on the plurality of data capture prioritization parameters. The electronic processor is configured to transmit, to each of the at least one of the plurality of listening posts, the at least one post over-the-air data capture parameter for the listening post.

Another example embodiment provides a method for collecting over-the-air data from a plurality of communication channels using a plurality of listening posts. The method includes receiving, via a communication interface, a plurality of data capture prioritization parameters for the plurality of communication channels. The method includes assigning, with an electronic processor, at least one of the plurality of listening posts to listen for data from at least one of the plurality of communication channels based on the plurality of data capture prioritization parameters. The method includes determining, with the electronic processor, for each of the at least one of the plurality of listening posts, at least one post over-the-air data capture parameter based on the plurality of data capture prioritization parameters. The method includes transmitting, to each of the at least one of the plurality of listening posts, the at least one post over-the-air data capture parameter for the listening post.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
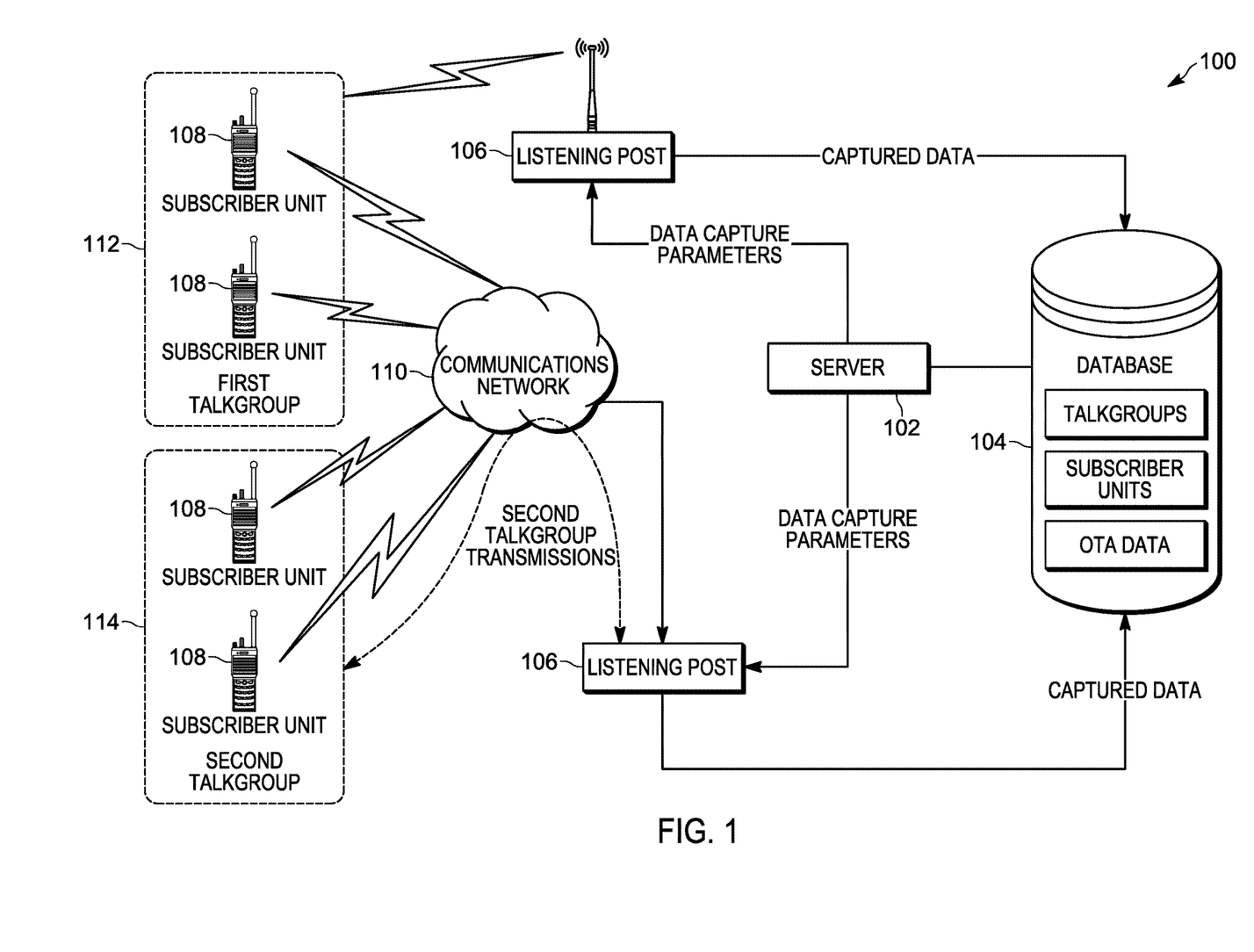
FIG. 1 is a diagram of a communication system, in accordance with some embodiments.
Figure 2:
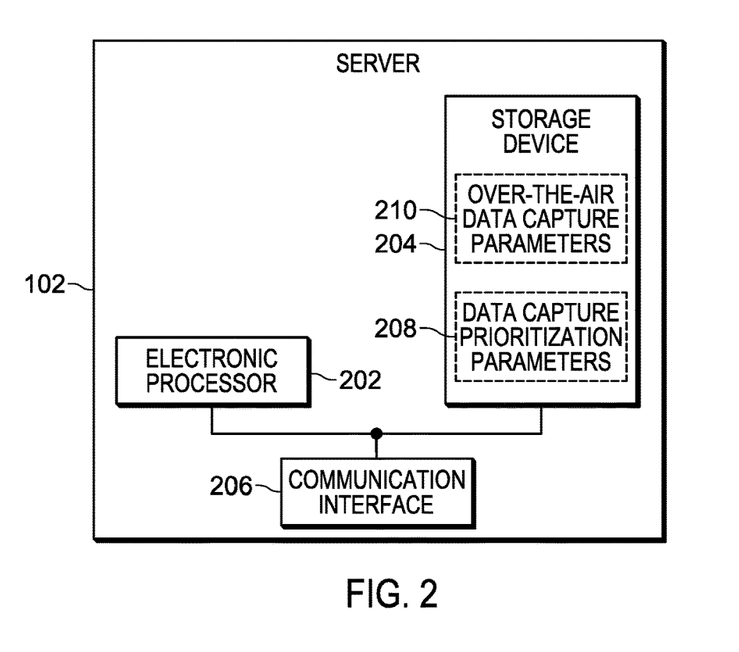
FIG. 2 is a diagram of a server included in the communication system of FIG. 1, in accordance with some embodiments.

FIG. 1 illustrates an example communication system 100. The communication system 100 includes a server 102, a database 104, a plurality of listening posts 106, and a plurality of subscriber units 108. The server 102, described more particularly below with respect to FIG. 2, is communicatively coupled to, and writes data to and from, the database 104. As illustrated in FIG. 1, the database 104 may be a database housed on a suitable database server communicatively coupled to and accessible by the server 102. In alternative embodiments, the database 104 may be part of a cloud-based database system (for example, a data warehouse) external to the system 100 and accessible by the server 102 over one or more wired or wireless networks. In some embodiments, all or part of the database 104 may be locally stored on the server 102. In some embodiments, as described below, the database 104 electronically stores talkgroup data (for example, designating which of the subscriber units 108 are assigned to which talkgroups), subscriber unit data (for example, model, configuration, and user information for the subscriber units 108), and over-the-air data (for example, telemetry data transmitted by the subscriber units 108 and received from the listening posts 106).

The subscriber units 108 are communicatively coupled via a communications network 110. The communications network 110 may include a land mobile radio (LMR) network, a terrestrial trunked radio (TETRA) network, or a digital mobile radio (DMR) network. The communications network 110 may also include a wide area network (WAN) (for example, a transport control protocol/internet protocol (TCP/IP) based network, a cellular network, such as, for example, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3G network, a 4G network, a 5G network, a device-to-device network, and combinations or derivatives thereof.

The communications network 110 operates in either a conventional or trunked configuration. In either configuration, the plurality of subscriber units 108 is partitioned into separate groups of communication devices. In a conventional narrowband system, each subscriber unit in a group is selected to a particular radio channel (frequency or frequency & time slot) for communications associated with that subscriber unit's group. Thus, each group is served by one channel, and multiple groups may share the same single frequency (in which case, in some embodiments, group IDs may be present in the group data to distinguish between groups using the same shared frequency).

In contrast, a trunked radio system and its subscriber units use a pool of traffic channels for virtually an unlimited number of groups of subscriber units (for example, talkgroups). Thus, all groups are served by all channels. In the example illustrated in FIG. 1, the subscriber units 108 are divided into two talkgroups, a first talkgroup 112, and a second talkgroup 114. A trunked radio system works to take advantage of the probability that not all groups need a traffic channel for communication at the same time. With a given number of channels, a much greater number of groups may be accommodated in a trunked radio system as compared with a conventional radio system.

Figure 3:
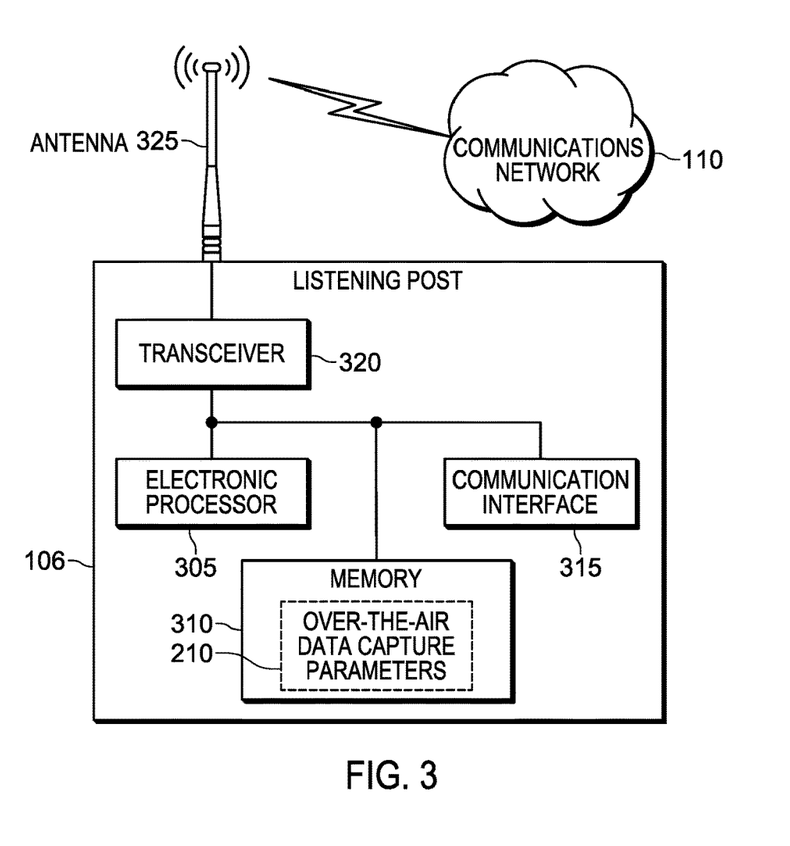
FIG. 3 is a diagram of a listening post of the communication system of FIG. 1, in accordance with some embodiments.

The subscriber units 108 and the listening posts 106 are capable of concurrent voice and data transmission and reception. The listening posts 106, described more particularly below with respect to FIG. 3, are communicatively coupled to the server 102 and the database 104. While operating to transmit users' voice calls, the subscriber units 108 encode and transmit telemetry data, also referred to herein as over-the-air data. The listening posts 106 receive the transmissions, and decode the telemetry data. Some methods for the concurrent transmission of voice and data are known, for example, the hardware and software illustrated and described in U.S. Pat. No. 9,232,376 B2 ("CONCURRENT VOICE AND DATA SERVICE ON A SAME DIGITAL RADIO CHANNEL"), issued Jan. 5, 2016. As described in detail below with respect to FIG. 4, the listening posts 106 receive data capture parameters from the server 102, capture over-the-air data from the subscriber units 108, and send the captured over-the-air data to the database 104. In some embodiments, the captured over-the-air data may be sent to the server 102, or to another database or server outside of the system 100.

FIG. 2 schematically illustrates the server 102 in more detail. In the example provided, the server 102 includes an electronic processor 202, a storage device 204, and a communication interface 206. The electronic processor 202, the storage device 204, and the communication interface 206 communicate over one or more communication lines or buses, wirelessly, or a combination thereof.

The electronic processor 202 may include a microprocessor, application-specific integrated circuit (ASIC), or another suitable electronic device. The electronic processor 305 obtains and provides information (for example, from the storage device 204 and/or the communication interface 206), and processes the information by executing one or more software instructions or modules, capable of being stored, for example, in a random access memory ("RAM") area of the storage device 204 or a read only memory ("ROM") of the storage device 204 or another non-transitory computer readable medium (not shown). The software can include firmware, one or more applications, program data, filters, rules, one or more program modules, and other executable instructions. The electronic processor 202 is configured to retrieve from the storage device 204 and execute, among other things, software related to the control processes and methods described herein.

The storage device 204 can include one or more non-transitory computer-readable media, and includes a program storage area and a data storage area. The program storage area and the data storage area can include combinations of different types of memory, as described herein. In the embodiment illustrated, the storage device 204 stores, among other things, data capture prioritization parameters 208 and over-the-air data capture parameters 210 (both described in detail below).

The communication interface 206 may include a transceiver (for example, a Wi-Fi or Ethernet transceiver) for communicating over one or more wired or wireless communication networks or connections.

In some embodiments, the server 102 performs machine learning functions. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data, and progressively refine algorithms for data analytics.

FIG. 3 illustrates an example of a listening post 106. In the embodiment illustrated, the listening post 106 includes an electronic processor 305, a memory 310, a communication interface 315, a transceiver 320, and an antenna 325. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 305 obtains and provides information (for example, from the memory 310 and/or the communication interface 315), and processes the information by executing one or more software instructions or modules, capable of being stored, for example, in a random access memory ("RAM") area of the memory 310 or a read only memory ("ROM") of the memory 310 or another non-transitory computer readable medium (not shown). The software can include firmware, one or more applications, program data, filters, rules, one or more program modules, and other executable instructions. The electronic processor 305 is configured to retrieve from the memory 310 and execute, among other things, software related to the control processes and methods described herein. For example, the electronic processor 305 is configured to decode data from radiofrequency transmissions that contain concurrent voice and data signals (for example, received via the transceiver 320 and the antenna 325). The memory 310 can include one or more non-transitory computer-readable media, and includes a program storage area and a data storage area. The program storage area and the data storage area can include combinations of different types of memory, as described herein. In the embodiment illustrated, the memory 310 stores, among other things, over-the-air data capture parameters 210 (described in detail below).

The communication interface 315 is configured to receive input and to provide system output. The communication interface 315 includes hardware (for example, a Wi-Fi or Ethernet transceiver) for communicating over one or more wired or wireless communication networks or connections with, for example, the server 102.

The electronic processor 305 is configured to control the transceiver 320 to transmit and receive digital radios signals to and from, for example, the communications network 110 and/or the subscriber units 108 using the antenna 325. The electronic processor 305 and the transceiver 320 may include various digital and analog components, which for brevity are not described herein and which may be implemented in hardware, software, or a combination of both. Some embodiments include separate transmitting and receiving components, for example, a transmitter and a receiver, instead of a combined transceiver 320. In some embodiments, the transceiver 320 and antenna 325 are omitted, and a subscriber unit or other device capable of receiving talkgroup communications is coupled to the listening post 106.

As illustrated in FIG. 1, in some embodiments, the listening post 106 receives transmissions for a talkgroup (for example, the first talkgroup 112) by receiving wireless transmissions from the subscriber units 108 via the antenna 325 and the transceiver 320. In other embodiments, the listening post 106 is coupled directly to the infrastructure of the communications network 110 via the communication interface 315, and receives talkgroup transmissions (for example, from the second talkgroup 114) over a wired or wireless data connection to the infrastructure. When coupled to the infrastructure, the listening post 106 is able to receive talkgroup transmissions from multiple talkgroups simultaneously.

Figure 4:
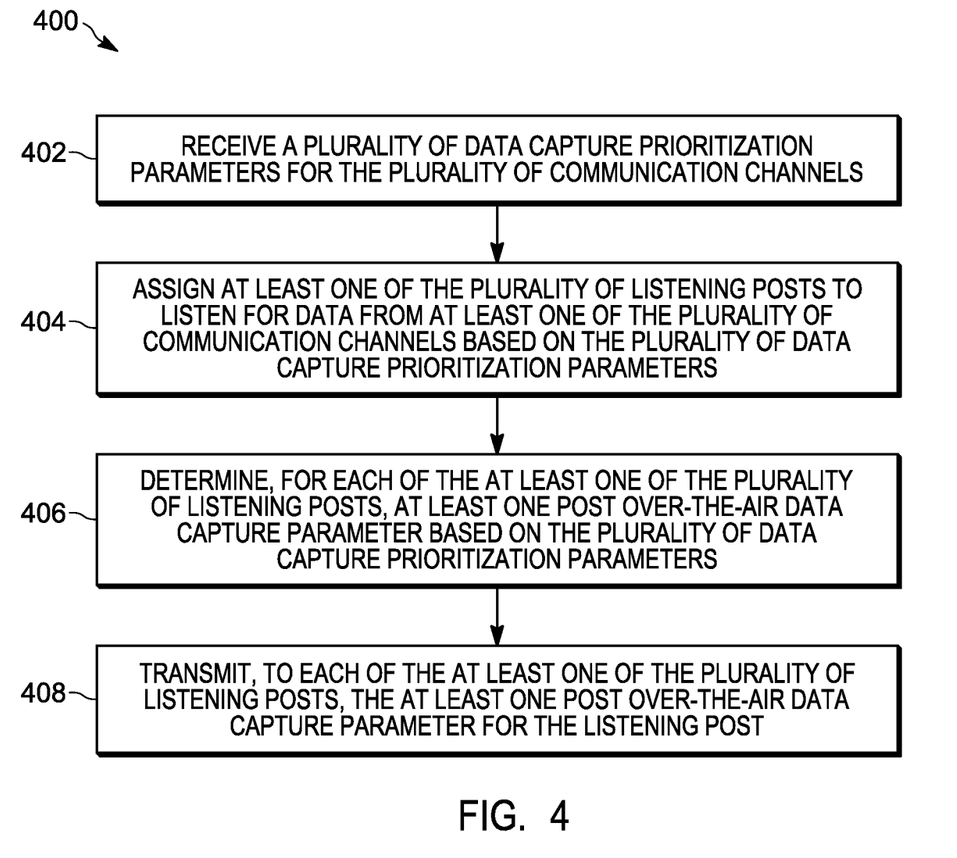
FIG. 4 is a flowchart of a method for collecting over-the-air data from a plurality of communication channels using a plurality of listening posts, in accordance with some embodiments.

As noted, current methods of monitoring talkgroup transmissions for telemetry data may result in missed data transmissions, the collection of redundant data, or both. Furthermore, such methods may take longer than desired, waste resources, and fail to take into account the importance of certain data types and operator or customer priorities. Accordingly, FIG. 4 illustrates a method 400 for adaptive talkgroup selection and resource assignment for listening posts. The method 400 is explained in terms of collecting over-the-air data from a plurality of communication channels using a plurality of listening posts (for example, the listening posts 106). As used herein, the term "communication channel" may refer to a talkgroup (for example, the first talkgroup 112 and the second talkgroup 114), a conventional radio channel, or another means of grouping subscriber unit radiofrequency communications. The method 400 is described as being performed by the server 102 and, in particular, the electronic processor 202. However, it should be understood that in some embodiments, portions of the method 400 may be performed by other devices, including for example, the listening posts 106 and the subscriber units 108. While FIG. 1 illustrates two listening posts, four subscriber units, and two talkgroups, it should be understood that embodiments of the method 400 may be used to collect data from more subscriber units and talkgroups than illustrated.

As illustrated in FIG. 4, at block 402, the electronic processor 202 receives, via the communication interface 206, a plurality of data capture prioritization parameters for the plurality of communication channels. The data capture prioritization parameters are used to determine how many listening posts will be deployed, what the listening posts will listen to, and for how long. The data capture prioritization parameters represent priorities or importance assigned by the customer or communications system operator. The data capture prioritization parameters may be received from a user through a human machine interface, from an electronic command issued from another system, retrieved from the database 104, or by another suitable means. The electronic processor 202 uses the data capture prioritization parameters to make the recovery of certain data (for example, types of data, data from particular talkgroups, data from particular subscriber units, and the like) more or less likely. One example of a data capture prioritization parameter includes a desired data type, for example, a battery level, a received signal strength indicator (RSSI), automatic frequency control (AFC) information, a push-to-talk block indication, and the like. Another example of a data capture prioritization parameter is a communication channel priority. For example, a priority may be assigned to a talkgroup indicating that its data should be collected before the data for a talkgroup having a lower priority is collected. Another example of a data capture prioritization parameter is a required communication channel, which may be used, for example, to indicate that a particular talkgroup's data must be collected. In such case, if there are not enough listening posts available to collect data for all talkgroups, data collection for lower priority talkgroups may be sacrificed to ensure collection of the required talkgroup. Another example of a data capture prioritization parameter is a communication data-to-channel mapping. For example, a particular data type may be available from some talkgroups and not others. A data-to-channel mapping indicates which talkgroups contain which types of data. In one example, all talkgroups may provide RSSI data, while only one talkgroup provides AFC data for law enforcement personnel. Using the data-to-channel mapping, the electronic processor 202 can decide which talkgroups must be scheduled in order to collect the desired data. Another example of a data capture prioritization parameter is a data time requirement. For example, a talkgroup used by first responders may have a data time requirement calling for around-the-clock data collection, whereas a talkgroup used by a retail big box store sales force may have a data time requirement calling for data collection only during business hours. Another example of a data capture prioritization parameter is the number of available listening posts. For example, when fewer listening posts are available, this may reduce the amount of time that listening posts are assigned to monitor data for a particular talkgroup, in order to gather as much data as possible from as many talkgroups as possible. In another example, when a larger number of listening posts is available, this may increase the time that one or more listening posts are assigned to, for example, a high priority talkgroup. Another example of a data capture prioritization parameter is a communication system priority. A communications channel (for example, a talkgroup) is part of a larger communications system. In some embodiments, the systems and methods described herein may be used with multiple communications systems (for example, for multiple customers being managed by a single entity, multiple divisions of a government, and the like). In such embodiments, some communications systems may be assigned a higher priority over other communication systems. For example, one customer may have a service level agreement guaranteeing a higher level of service than another customer. In another example, a public safety communication system may be assigned a higher priority than a parks department communication system.

At block 404, the electronic processor 202 assigns at least one of the plurality of listening posts to listen for data from at least one of the plurality of communication channels based on the plurality of data capture prioritization parameters. In some embodiments, the electronic processor 202 determines, based on the parameters (received at block 402), the minimum number of listening posts required to accomplish the customer-required data recovery. For example, if data for two talkgroups is requested, it may be possible to collect such data using a single listening post, alternating between the talkgroups based on the parameters. In another example, one of the requested talkgroups may be a required talkgroup with a data time requirement of continuous data collection. In such case, the electronic processor 202 may dedicate a listening post exclusively to the required talkgroup. When some listening posts remain unassigned, there is a surplus of listening capability. The electronic processor 202 may deploy such surplus to allow dedicated monitoring of higher priority talkgroups. For example, a police talkgroup may be a high priority. A listening post may originally be assigned to monitor the police talkgroup and several other talkgroups. The electronic processor 202 may deploy an extra listening post to the other talkgroups, and dedicate the originally-assigned listening post to the police talkgroup to improve the chances that all data will be collected across all talkgroups. In another embodiment, listening posts may be moved between communications systems based on the parameters and system usage.

In some embodiments, the electronic processor 202 assigns the listening posts based on the plurality of data capture prioritization parameters and at least one data collection time estimate. A data collection time estimate represents an estimated time to collect the requested data. In some embodiments, the data collection time estimate is calculated based on past data collections for similar data requests for the same talkgroups or data types. In some embodiments, time estimates are user-provided. Examples of data collection time estimates include a total data collection estimate (that is, the estimated time to collect all requested data from all talkgroups), a communication channel estimate (that is, the estimated time to collect the requested data from a particular talkgroup), a communication device estimate (that is, the estimated time to collect the requested data from a particular subscriber unit or group of subscriber units), and an additional listening post estimate (that is, the estimated time to collect the requested data if one or more additional listening posts are deployed). In some embodiments, one or more time estimate values are taken into account when assigning listening posts. For example, if a communication channel estimate exceeds the time window presented in the talkgroup's data time requirement, the electronic processor 202 may assign an additional listening post to that talkgroup to decrease the time required to collect the data.

At block 406, the electronic processor 202 determines, for each of the at least one of the plurality of listening posts, at least one post over-the-air data capture parameter based on the plurality of data capture prioritization parameters. A post over-the-air data capture parameter is a parameter used by a listening post while it operates to capture data. One example of a post over-the-air data capture parameter is a communication channel assignment (for example, which talkgroup or talkgroups the listening post is assigned to monitor). Another example of a post over-the-air data capture parameter is a communication channel listening duration (for example, for how long, or between which times, a listening post should listen to one of its assigned talkgroups). Another example of a post over-the-air data capture parameter is a subscriber unit identifier (for example, identifying a particular subscriber unit from which to collect data).

One or more post over-the-air data capture parameters may be used to set an operational schedule (or "mission") for a listening post. Using post over-the-air data capture parameters, for a given period of time, the listening post has a timed schedule of what talkgroups to listen to and what data to collect on those talkgroups. For example, a listening post may be assigned to listen for 10 minutes on the first talkgroup 112, and for 10 minutes on the second talkgroup 114, for a period of 8 hours starting at 6 am. In some embodiments, the listening post is configured to determine when it has received all of the data required for the first talkgroup 112, and remove the first talkgroup 112 from its schedule to focus on the second talkgroup 114.

In some embodiments, the electronic processor 202 assigns a weight to one or more of the plurality of data capture prioritization parameters. The weight is used to indicated a how significant a particular data capture prioritization parameter is to assigning listening posts and determining the post over-the-air data capture parameters, relative to the other data capture prioritization parameter. Data capture prioritization parameters with higher weights contribute more to the determination of listening post assignments and post over-the-air data capture parameters than data capture prioritization parameters with higher weights. In some embodiments, each data capture prioritization parameter begins with an equal weight (for example, zero). As noted, the database 104 includes harvested over-the-air data, for example, gathered from previous iterations of the method 400. In some embodiments, the electronic processor 202 retrieves, from the database 104, the harvested over-the-air data. For each of the data capture prioritization parameters, the electronic processor 202 updates the parameter's weight based on the harvested over-the-air data. For example, the electronic processor 202 may update the weight based on an orphan subscriber unit, a missing data entry, a missing data distribution, or combinations of the foregoing.

An orphan subscriber unit is one that has not reported data for a predetermined period of time. In some embodiments, weights for the data capture prioritization parameters associated with the orphan subscriber unit are increased to increase the chances that the data from the orphan subscriber unit will be collected. In one example, if there are certain subscriber units that transmit infrequently, they may be flagged as orphans. As noted, the electronic processor 202 begins with equal weighting across talkgroups to recover, for example, battery information. The weighting might quickly become unequal as the data begins arriving. This process might be modeled with standard formulas for exponential decay such that, initially, a flood of battery reports are issued from the subscriber units and gradually tail off as more and more infrequent users report. At some point, very infrequent users may be declared orphans, also modeling late stages of the exponential behavior. Depending on the subscriber units and the data requested, the electronic processor 202 may use different scaling of the exponential decay to predict the rough order of magnitude of time it will take to finalize the data collection. In some embodiments, data may be represented by linear equations.

In some embodiments, the weighting is a function of how much has been received in an allotted amount of time. For example, if four hours was allotted to retrieve battery information from 500 users, but only 250 battery reports have been received (that is, there are 250 missing data entries), the electronic processor 202 would increase the weights for the data capture prioritization parameters associated with the talkgroups containing the missing entries, dedicating more time to collecting that data. In some embodiments, the weighting is a function of missing data distribution. For example, if all of the missing data entries are on single talkgroup, the electronic processor 202 would increase the weights for the data capture prioritization parameters associated with that talkgroup. However, if the missing reports are distributed among multiple talkgroups, the electronic processor 202 would assign higher weights to the data capture prioritization parameters associated with the talkgroups with more missing data entries, and lower weights to those associated with the talkgroups with fewer missing data entries.

In some embodiments, the weights are determined and updated using a machine learning algorithm (for example, a neural network or a classifier). Over time, as over-the-air data is harvested from talkgroups, the machine learning algorithm may determine that particular data capture prioritization parameters are more determinative to efficient or complete data collection than others, and thus increase the weight for those data capture prioritization parameters.

Regardless of how the post over-the-air data capture parameters are determined, at block 408, the electronic processor 202 transmits, to each of the at least one of the plurality of listening posts, the at least one post over-the-air data capture parameter for the listening post. Upon receiving the post over-the-air data capture parameters, the listening posts execute the listening mission defined by the parameters repetitively, either continuously or until the data capture is accomplished. Upon completion of a data capture mission, the listening post notifies the server that it is complete. Depending on the post over-the-air data capture parameters, the listening post will either await further instruction on the currently assigned talkgroup(s), or be returned to the pool of available listening posts for reassignment.

In some embodiments, the electronic processor 202 may determine a data collection error condition. For example, the electronic processor 202, after determining the plurality of data capture prioritization parameters, may determine that a particular number of listening posts is required to collect the requested data in the allotted time. When the required number of listening posts exceeds a quantity of available listening posts, the electronic processor 202 determines that the data cannot be collected as requested, and generates a data collection error condition. In some embodiments, as the listening posts report back their collected data, the electronic processor 202 may determine a data collection error condition. For example, subscriber units repeatedly flagged as orphans may generate a data collection error condition. Orphans will eventually be dropped from the rotation with notification to the user. For example, a significant number of orphans could eventually cause the listening post's missions to be ineffective, because they are always waiting for a straggler before giving up. A data error condition would refuse to allow collection of data from some orphan unit prevent the listening post from completing a mission despite that unit being flagged as part of a talkgroup or as a priority user, from which to collect data. Additionally, metrics may be collected about how long it takes to get data from the required subscribers and talkgroups so that the threshold for being deemed an orphan can be another configuration parameter.

In another example, receiving an indication from a listening post that it has not collected all data in the scheduled time may generate a data collection error condition. Regardless of how it is determined, in response to determining the data collection error condition, the electronic processor 202 will transmit an alert. For example, a visual or audio alert may be generated on a human machine interface or a text message may be sent to one or more communication devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A system for collecting over-the-air data using a plurality of listening posts, the system comprising:
a communication interface; and
an electronic processor coupled to the communication interface and configured to receive, via the communication interface, a plurality of data capture prioritization parameters for a plurality of communication channels for a communications network, wherein the data capture prioritization parameters are used to determine how many of the plurality of listening posts will be deployed, what the deployed listening posts will listen to, and for how long the deployed listening posts will listen and wherein the plurality of data capture prioritization parameters includes a desired data type, the desired data type including at least one selected from the group consisting of a battery level, a received signal strength indicator (RSSI), automatic frequency control (AFC) information, and a push-to-talk block indication;

assign at least one of the plurality of listening posts to listen for data from at least one of the plurality of communication channels, each of which includes talkgroup transmissions including concurrent voice and data signals, based on the plurality of data capture prioritization parameters, wherein none of the plurality of listening posts is a subscriber unit of the communications network;

determine, for each of the at least one of the plurality of listening posts, at least one post over-the-air data capture parameter to be used by the listening post while it operates to capture data from talkgroup transmissions, based on the plurality of data capture prioritization parameters, wherein the at least one post over-the-air data capture parameter includes at least one selected from the group consisting of a communication channel assignment, a communication channel listening duration, and a subscriber unit identifier; and transmit, to each of the at least one of the plurality of listening posts, the at least one post over-the-air data capture parameter for the listening post.

2. The system of claim 1, further comprising:
a database storing over-the-air data harvested from the plurality of communication channels;
wherein the electronic processor is further configured to
assign a weight to each of the plurality of data capture prioritization parameters;
retrieve from the database, the harvested over-the-air data; and
for each of the plurality of data capture prioritization parameters, update the weight based on the harvested over-the-air data.

3. The system of claim 2, wherein the electronic processor is further configured to update the weight for each of the at least one post over-the-air data capture parameters based on at least one selected from the group consisting of an orphan subscriber unit, a missing data entry, and a missing data distribution.

4. The system of claim 1, wherein the electronic processor is further configured to assign at least one of the plurality of listening posts to listen for data from at least one of the plurality of communication channels based on the plurality of data capture prioritization parameters and at least one data collection time estimate.

5. The system of claim 4, wherein the at least one data collection time estimate includes at least one selected from the group consisting of a total data collection estimate, a communication channel estimate, a communication device estimate, and an additional listening post estimate.

6. The system of claim 1, wherein the plurality of data capture prioritization parameters further includes at least one selected from the group consisting of, a communication channel priority, a required communication channel, a communication data-to-channel mapping, a data time requirement, a number of available listening posts, and a communication system priority.

7. The system of claim 1, wherein the plurality of communication channels includes a plurality of talkgroups.

8. The system of claim 1, wherein the electronic processor is further configured to
determine a data collection error condition, and
in response to determining the data collection error condition, transmit an alert.

9. The system of claim 8, wherein the electronic processor determines a data collection error condition by determining, based on the plurality of data capture prioritization parameters, that a required number of listening posts exceeds a quantity of available listening posts.

10. A method for collecting over-the-air data using a plurality of listening posts, the method comprising:
receiving, via a communication interface, a plurality of data capture prioritization parameters for a plurality of communication channels for a communications network, wherein the data capture prioritization parameters are used to determine how many of the plurality of listening posts will be deployed, what the deployed listening posts will listen to, and for how long the deployed listening posts will listen and wherein the plurality of data capture prioritization parameters includes a desired data type, the desired data type including at least one selected from the group consisting of a battery level, a received signal strength indicator (RSSI), automatic frequency control (AFC) information, and a push-to-talk block indication;
assigning, with an electronic processor, at least one of the plurality of listening posts to listen for data from at least one of the plurality of communication channels, each of which includes talkgroup transmissions including concurrent voice and data signals, based on the plurality of data capture prioritization parameters, wherein none of the plurality of listening posts is a subscriber unit of the communications network;
determining, with the electronic processor, for each of the at least one of the plurality of listening posts, at least one post over-the-air data capture parameter to be used by the listening post while it operates to capture data from talkgroup transmissions, based on the plurality of data capture prioritization parameters, wherein the at least one post over-the-air data capture parameter includes at least one selected from the group consisting of a communication channel assignment, a communication channel listening duration, and a subscriber unit identifier; and
transmitting, to each of the at least one of the plurality of listening posts, the at least one post over-the-air data capture parameter for the listening post.

11. The method of claim 10, further comprising:
assigning a weight to each of the plurality of data capture prioritization parameters;
retrieving from a database storing over-the-air data harvested from the plurality of communication channels, the harvested over-the-air data; and
for each of the plurality of data capture prioritization parameters, updating the weight based on the harvested over-the-air data.

12. The method of claim 11, wherein updating the weight for each of the at least one post over-the-air data capture parameters includes updating the weight based on at least one selected from the group consisting of an orphan subscriber unit, a missing data entry, and a missing data distribution.

13. The method of claim 10, wherein assigning at least one of the plurality of listening posts to listen for data from at least one of the plurality of communication channels includes assigning at least one of the plurality of listening posts based on the plurality of data capture prioritization parameters and at least one data collection time estimate.

14. The method of claim 13, wherein assigning at least one of the plurality of listening posts based on the at least one data collection time estimate includes assigning at least one of the plurality of listening posts based on at least one selected from the group consisting of a total data collection estimate, a communication channel estimate, a communication device estimate, and an additional listening post estimate.

15. The method of claim 10, wherein receiving a plurality of data capture prioritization parameters further includes receiving at least one selected from the group consisting of, a communication channel priority, a required communication channel, a communication data-to-channel mapping, a data time requirement, a number of available listening posts, and a communication system priority.

16. The method of claim 10, wherein receiving a plurality of data capture prioritization parameters for the plurality of communication channels includes receiving a plurality of data capture prioritization parameters for a plurality of talkgroups.

17. The method of claim 10, further comprising:
   determining a data collection error condition, and
   in response to determining the data collection error condition, transmitting an alert.

18. The method of claim 17, wherein determining a data collection error condition includes determining, based on the plurality of data capture prioritization parameters, that a required number of listening posts exceeds a quantity of available listening posts.

\* \* \* \* \*